US012431009B2

(12) United States Patent
Srivastava et al.

(10) Patent No.: US 12,431,009 B2
(45) Date of Patent: Sep. 30, 2025

(54) INTEGRATED, INTERDEPENDENT SYSTEM FOR VERIFYING FIRE ALARMS

(71) Applicant: Honeywell International Inc., Charlotte, NC (US)

(72) Inventors: Anushka Srivastava, Bengaluru (IN); Rajesh Babu Nalukurthy, Atlanta, GA (US); Jesse J. Otis, North Haven, CT (US); Poshith Udayashankar, Bangalore (IN); Vipin Das E K, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 148 days.

(21) Appl. No.: 18/229,456

(22) Filed: Aug. 2, 2023

(65) Prior Publication Data

US 2025/0046178 A1 Feb. 6, 2025

(51) Int. Cl.
*G08B 29/18* (2006.01)
*G08B 17/06* (2006.01)

(52) U.S. Cl.
CPC ........... *G08B 29/185* (2013.01); *G08B 17/06* (2013.01)

(58) Field of Classification Search
CPC .............................. G08B 29/185; G08B 17/06
See application file for complete search history.

(56) References Cited

U.S. PATENT DOCUMENTS 5,945,924 A * 8/1999 Marman ................ G08B 17/10 340/928
6,998,960 B2 * 2/2006 Buschmann ........... G08B 7/066 340/525
7,142,105 B2 11/2006 Chen
9,824,574 B2 11/2017 Piccolo, III
10,803,720 B2 10/2020 Bucsa et al.
10,901,373 B2 1/2021 Locke et al.
11,783,652 B2 * 10/2023 Chaurasia .............. G16H 40/63 340/5.2

(Continued)

FOREIGN PATENT DOCUMENTS

EP 1901254 A1 3/2008
WO WO-2008031680 A1 * 3/2008 ........... G08B 25/001
WO 2019224122 A1 11/2019

OTHER PUBLICATIONS

Gong, et al., "A Real-Time Fire Detection Method from Video with Multifeature Fusion"; Hindawi, Computational Intelligence & Neuroscience, vol. 2019, Article ID 1939171 (Jul. 14, 2019) (18 pgs) https://doi.org/10.1155/2019/1939171.

*Primary Examiner* — Hoi C Lau
(74) *Attorney, Agent, or Firm* — Brooks, Cameron & Huebsch, PLLC

(57) ABSTRACT

One method includes identifying a fire event by analyzing sensor data from at least one sensor of a fire sensing device of a fire alarm subsystem at a facility being monitored by the fire alarm subsystem, after identifying the fire event by analyzing the sensor data from the at least one sensor of the fire sensing device, accessing data from at least one secondary subsystem to determine if the secondary subsystem data indicates the fire event is occurring, and if the fire event has been identified by analyzing the sensor data from the at least one sensor of the fire sensing device and data from at least one secondary subsystem indicates the fire event is occurring, then initiating an alarm to an emergency response center.

11 Claims, 1 Drawing Sheet

(56) References Cited

U.S. PATENT DOCUMENTS

| | | | | |
|---|---|---|---|---|
| 2004/0075572 | A1* | 4/2004 | Buschmann | G08B 7/062 340/691.1 |
| 2005/0110632 | A1* | 5/2005 | Berezowski | G08B 17/00 340/521 |
| 2005/0273279 | A1* | 12/2005 | Faltesek | A62C 99/009 702/51 |
| 2012/0125558 | A1* | 5/2012 | Nortman | G01F 1/68 73/204.25 |
| 2014/0291778 | A1* | 10/2014 | Vaiana | G01N 27/225 438/49 |
| 2014/0318159 | A1* | 10/2014 | Eisenhour | B60H 1/3211 62/89 |
| 2018/0178613 | A1* | 6/2018 | Zhang | G08B 21/12 |
| 2019/0171780 | A1* | 6/2019 | Santarone | G02B 27/0093 |
| 2021/0208546 | A1* | 7/2021 | Locke | G05B 13/0265 |
| 2022/0154972 | A1* | 5/2022 | Furman | F24F 11/83 |
| 2025/0046178 | A1* | 2/2025 | Srivastava | G08B 17/06 |

* cited by examiner

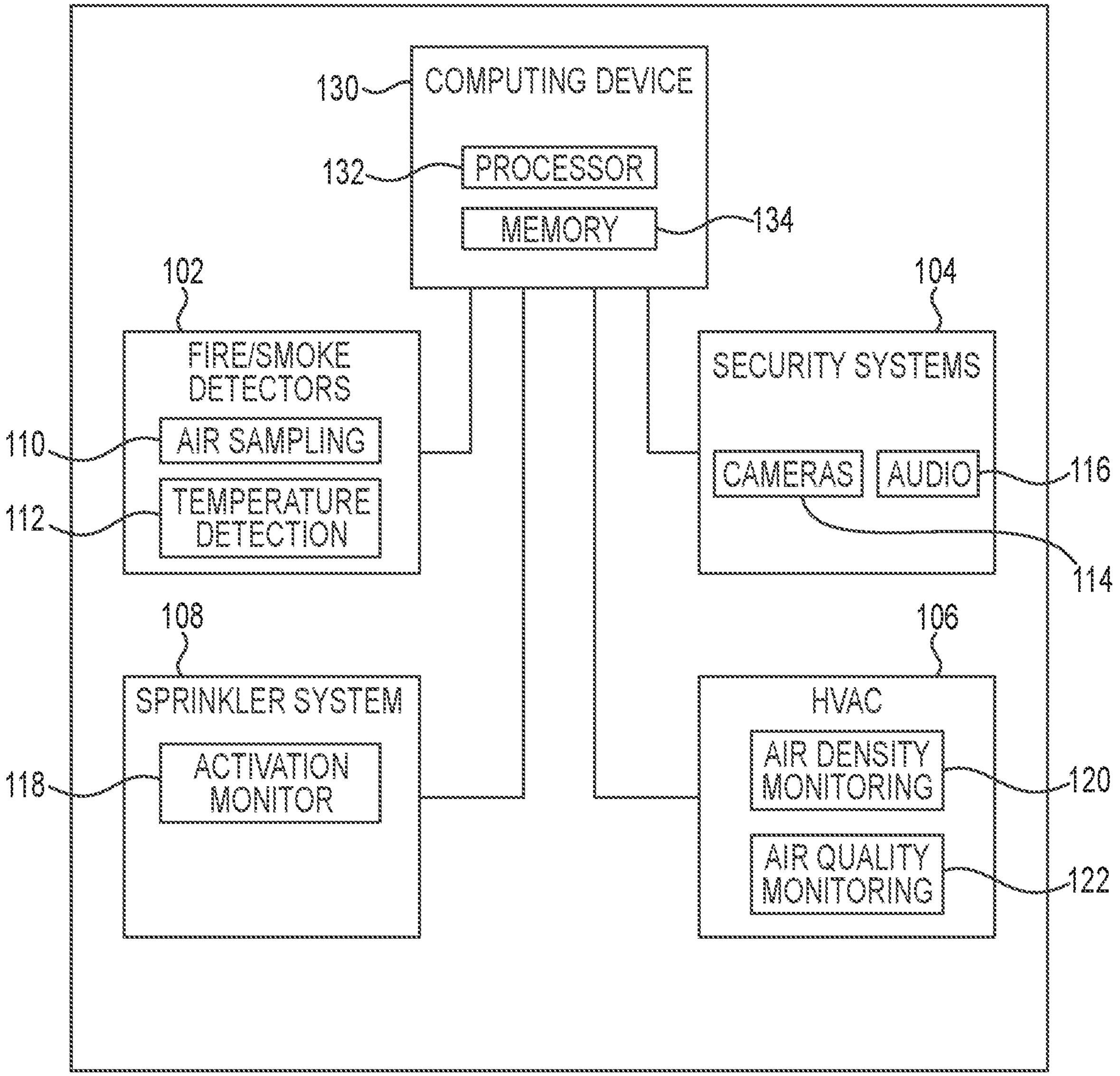
130
COMPUTING DEVICE
132
PROCESSOR
MEMORY
134
102
FIRE/SMOKE DETECTORS
110
AIR SAMPLING
112
TEMPERATURE DETECTION
104
SECURITY SYSTEMS
CAMERAS
AUDIO
116
114
108
SPRINKLER SYSTEM
118
ACTIVATION MONITOR
106
HVAC
AIR DENSITY MONITORING
120
AIR QUALITY MONITORING
122

INTEGRATED, INTERDEPENDENT SYSTEM FOR VERIFYING FIRE ALARMS

TECHNICAL FIELD

The present disclosure relates to systems, methods, and devices of providing an integrated, interdependent system for verifying fire alarms.

BACKGROUND

Facilities equipped with fire alarm subsystems allow for early detection of a fire event, such as a fire within a building. Typically, such facilities are large and can be complex (e.g., large building, multiple floors, facilities with multiple buildings) and such alarm subsystems allow for firefighting personnel to arrive more quickly.

The systems utilize specialized fire/smoke sensing devices (e.g., fire detectors that detect heat and/or smoke detectors that detect smoke particles to detect fires) spread throughout the facility that can detect when a fire may be occurring. These alarm subsystem devices communicate sensor data to an on premise alarm subsystem control panel that collects and analyzes the data to determine whether a fire event is occurring, and contacts emergency personnel to come to the facility to deal with the fire.

BRIEF DESCRIPTION OF THE DRAWINGS

FIG. 1 is a fire alarm subsystem in accordance with one or more embodiments of the present disclosure.

DETAILED DESCRIPTION

Embodiments of the present disclosure relate to systems, methods, and devices of providing an integrated, interdependent system for verifying fire alarms. Current fire alarm systems provide very little protection from false alarms and, accordingly, fire alarm systems initiate a physical visit from emergency personnel even though ninety percent of these events are false alarms. This is a substantial waste of financial and human resources. These false alarms also may make the emergency personnel unavailable or inconveniently located when actual fire events occur.

Embodiments of the present disclosure integrate data from different subsystems within a facility, that are not connected to a fire alarm subsystem, to reduce false alarms. For example, one method includes identifying a fire event by analyzing sensor data from at least one sensor of a fire sensing device of a fire alarm subsystem at a facility being monitored by the fire alarm subsystem, after identifying the fire event by analyzing the sensor data from the at least one sensor of the fire sensing device, accessing data from at least one secondary subsystem to determine if the secondary subsystem data indicates the fire event is occurring, and if the fire event has been identified by analyzing the sensor data from the at least one sensor of the fire sensing device and data from at least one secondary subsystem with each indicating the fire event is occurring, then initiating an alarm to an emergency response device, such as a portable device of an emergency responders or at an emergency response center that receives alarm indications and forwards them to emergency responders.

In another example, a fire alarm subsystem can utilize one type or a variety of fire sensing devices, such as smoke detectors, temperature sensors, and/or pull stations, to sense if a fire event is occurring in an area of the facility being monitored by these fire sensing devices. This sense data or an indicator (an initial fire alarm signal) of a fire generated by a fire sensing device is then confirmed or the accuracy improved with data from other subsystems within the facility and then sent to a fire control panel that alerts emergency personnel to respond if a fire event is detected.

If a smoke detector of a fire alarm subsystem indicates the presence of a fire in a particular area of a building within the facility (a facility could have more than one building) and a fire sprinkler subsystem reports a water flow event in the same area, the presence of these two fire related events occurring in the same area at nearly the same time and in different subsystems can confirm or increase the certainty that an accurate alarm condition exists and a physical response (rolling fire trucks to the facility) by emergency responders is necessary.

Further, in various embodiments of the present disclosure, an event detected by a fire alarm subsystem device can be confirmed or accuracy increased by data from a surveillance subsystem having one or more cameras and/or audio sensors installed at the facility. These devices are for surveilling the facility and not for fire event detection. Again, here, when the fire alarm subsystem detects a fire event, this system for verifying fire alarms can access camera and/or audio sensors to determine whether the device(s) are also indicating a fire event is occurring.

Likewise, in some embodiments, air quality and/or air density from a heating ventilation air conditioning (HVAC) subsystem can be used with the fire alarm subsystem to confirm or more accurately determine whether a fire event is occurring. This data is collected by HVAC subsystems for the purposes of occupant comfort, not for fire detection.

Further, HVAC temperature sensors can, additionally or alternatively, be used with fire alarm subsystem data to confirm or more accurately determine whether a fire event is occurring. Here, again, this HVAC data is utilized by the HVAC subsystem for occupant comfort, not fire detection.

It should be noted that any combination of the above additional resources can be combined with the data from the fire alarm subsystem to confirm or more accurately determine whether a fire event is occurring. For example, some embodiments can utilize fire sprinkler subsystem data and HVAC air quality data together with fire alarm subsystem data to confirm or more accurately determine whether a fire event is occurring.

In other embodiments, fire sprinkler subsystem data and HVAC air quality data together with fire alarm subsystem data can be utilized to confirm or more accurately determine whether a fire event is occurring. Further, in various embodiments, air quality and air density can be utilized to confirm or more accurately determine whether a fire event is occurring.

And, temperature sensing from the HVAC subsystem can be utilized with fire alarm subsystem data and with HVAC air density, air quality, and/or sprinkler subsystem data to confirm or more accurately determine whether a fire event is occurring. By using more than one data resource, accuracy of determining whether a fire event is occurring can be substantially increased.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

As used herein, "a", "an", or "a number of" something can refer to one or more such things, while "a plurality of" something can refer to more than one such things. For example, "a number of sensors" can refer to one or more sensors, while "a plurality of sensors" can refer to more than one sensor.

FIG. 1 is a fire alarm subsystem in accordance with one or more embodiments of the present disclosure. The embodiments of the present disclosure allow data from unrelated subsystems within a facility to confirm or increase the accuracy of determining whether a fire event (e.g., smoke or fire) is occurring within an area that is being monitored by both, the fire alarm subsystem and a secondary subsystem (e.g., a fire sprinkler system, a surveillance subsystem, a heating ventilation air conditioning (HVAC) subsystem).

In some embodiments, the secondary subsystems can send data to a computing device of the fire alarm subsystem. For example, the fire alarm subsystem can have a fire alarm subsystem computing device, such as a subsystem controller (e.g., fire alarm system control panel) that can be used as the computational resource to review the data from various resources to determine if a fire event is occurring. This can be accomplished by having executable instructions on a secondary subsystem computing device that stores sense data from sensing devices in the secondary subsystem and sends the data to the fire alarm subsystem computing device. Alternatively, in some embodiments, the fire alarm subsystem computing device can request the data be sent from the secondary subsystem device.

Further, in some embodiments, a facility control computing device can have access to both, the fire alarm subsystem and the secondary subsystems. In this manner, the facility control computing device can access any sense data from any desired subsystem via such access.

In such an embodiment, the devices of the subsystems and the facility control computing device can be connected via a network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

As used herein, the term "computing device" refers to an electronic system having a processing resource (processor), memory resource (memory), and/or an application-specific integrated circuit (ASIC) that can process data. Examples of computing devices can include, for instance, a laptop computer, a notebook computer, a desktop computer, an All-In-One (AIO) computing device, a server, networking equipment (e.g., router, switch, etc.), and/or a mobile device, among other types of computing devices. As used herein, a mobile device can include devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices.

The facility control computing device can receive data from the various subsystem devices as illustrated in FIG. 1. For example, the computing device can receive temperature data, camera images, water flow data, air quality data, air density data, and/or data regarding information provided by occupants of the facility, such as voice recordings, as is further described herein.

FIG. 1 illustrates a facility having a number of subsystems operating independently therein. These subsystems are: fire alarm subsystem 102, surveillance subsystem 104, HVAC subsystem 106, and fire sprinkler subsystem 108. However, as this is an example of an interdependent system for verifying fire alarms of the present disclosure, the system includes executable instructions to determine whether a fire event is occurring based on data from the fire alarm subsystem as well as data from at least one of the secondary subsystems.

In the illustrated example of FIG. 1, the computing device 130 has these executable instructions stored in memory 134 and they are executed by processor 132. Although shown as a separate computing device, the functions described herein could be accomplished, for example, by a fire alarm subsystem computing device or a control panel computing device of the fire alarm subsystem (e.g., fire alarm subsystem controller) or other computing device communicatively connected to each subsystem. Such a computing device could be located at a location outside the facility (at a remote location).

The fire alarm subsystem 102 includes air sampling devices 110, such as smoke detectors, and temperature detection devices 112, such as flame or fire detectors that can determine the temperature in an area being monitored. The device data from one or more of these devices can be used to determine whether a fire event is occurring. If data from more than one device is utilized, the accuracy is increased. If data from different types of devices is utilized, the accuracy may be increased even more.

The surveillance subsystem 104 can include cameras 114 and/or audio sensors 116. For example, single frame or video cameras can be utilized as well as microphones. The surveillance subsystem is used to the movements of occupants on the facility.

However, in embodiments of the present disclosure, the camera data can be analyzed to determine if there is smoke or a flame visible in the field of view. The audio sensors can be used to receive sound data from the area being monitored or can be used to receive voice data from an occupant which may confirm (e.g., as an eyewitness) there is a fire event or that there is smoke but no fire or other helpful information.

The HVAC subsystem 106 includes air density sensing devices 120 and air quality sensing devices 122. HVAC subsystems are utilized to adjust the air passing through an area to make it more comfortable for the occupants. This can include heating and cooling the area to change the air temperature as well as using filters to filter out particulate. Sensors are used to determine the air quality and/or density.

In embodiments of the present disclosure, this air quality and/or density sensor data can be used to determine if there is a fire event occurring in the monitored area. For example, the sensor can identify when there is smoke or ash particulate in the air within the monitored area.

The sprinkler subsystem 108 is used to activate and deactivate fire sprinklers during fire events. Fire sprinkler subsystem 108 includes an activation monitoring component 118 that monitors the activation of sprinklers of the subsystem. One type of monitoring component is a water flow sensor that identifies when water is flowing through the subsystem (out a sprinkler head and into the area being monitored). Such systems are normally independent of a fire alarm system.

The use of more than one of the technologies, mentioned above, can ensure a much higher likelihood of accurately detecting a fire event. This can be beneficial in reducing the number of false alarms that are generated by the fire alarm system, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method, comprising:

identifying a fire event by analyzing sensor data from at least one sensor of a fire sensing device of a fire alarm subsystem at a facility being monitored by the fire alarm subsystem;

after identifying the fire event by analyzing the sensor data from the at least one sensor of the fire sensing device, accessing data from at least one secondary subsystem to determine if the secondary subsystem data indicates that the fire event is occurring, wherein:

the at least one secondary subsystem is a heating ventilation air conditioning subsystem that includes an air quality sensor that senses an air quality in an area being monitored and an air density sensor that senses an air density in the area being monitored; and the sensed air quality and air density in the area being monitored is used to determine whether the fire event is occurring; and if the fire event has been identified by analyzing the sensor data from the at least one sensor of the fire sensing device and data from at least one secondary subsystem indicates the fire event is occurring, then initiating an alarm to an emergency response computing device.

2. The method of claim 1, wherein the fire sensing device is a smoke detector having a mechanism to sense smoke in the area being monitored.

3. The method of claim 1, wherein the fire sensing device includes a temperature sensor having a mechanism to sense temperatures indicative of a fire in the area being monitored.

4. The method of claim 1, wherein the fire sensing device is a pull station having a mechanism to allow an occupant to report a fire in the area being monitored.

5. A fire alarm subsystem controller, comprising:

a processor and memory, the memory having instructions that are executable on the processor to:

identify a fire event by analyzing sensor data from at least one sensor of a fire sensing device of a fire alarm subsystem at a facility being monitored by the fire alarm subsystem;

after identifying the fire event by analyzing the sensor data from the at least one sensor of the fire sensing device, access data from a heating ventilation air conditioning (HVAC) subsystem to determine if the the HVAC data indicates that the fire event is occurring, wherein:

the HVAC subsystem includes an air quality sensor that senses an air quality in an area being monitored and an air density sensor that senses an air density in the area being monitored; and the sensed air quality and air density in the area being monitored is used to determine whether the fire event is occurring; and if the fire event has been identified by analyzing the sensor data from the at least one sensor of the fire sensing device and data from the HVAC subsystem indicates the fire event is occurring, then initiating an alarm to an emergency response computing device.

6. The fire alarm subsystem controller of claim 5, wherein the fire sensing device is a smoke detector having a mechanism to sense smoke in the area being monitored.

7. The fire alarm subsystem controller of claim 5, wherein the fire sensing device includes a temperature sensor having a mechanism to sense temperatures indicative of a fire in the area being monitored.

8. The fire alarm subsystem controller of claim 5, wherein the fire sensing device is a pull station having a mechanism to allow an occupant to report a fire in the area being monitored.

9. A non-transitory computer readable medium having computer readable instructions stored thereon that are executable by a processor to:

identifying a fire event by analyzing sensor data from at least one sensor of a fire sensing device of a fire alarm subsystem at a facility being monitored by the fire alarm subsystem;

after identifying the fire event by analyzing the sensor data from the at least one sensor of the fire sensing device, accessing data from at least one secondary subsystem to determine if the secondary subsystem data indicates that the fire event is occurring, wherein:

the at least one secondary subsystem is a heating ventilation air conditioning subsystem that includes an air quality sensor that senses an air quality in an area being monitored and an air density sensor that senses an air density in the area being monitored; and the sensed air quality and air density in the area being monitored is used to determine whether the fire event is occurring; and if the fire event has been identified by analyzing the sensor data from the at least one sensor of the fire sensing device and data from at least one secondary subsystem indicates the fire event is occurring, then initiating an alarm to an emergency response computing device.

10. The medium of claim 9, wherein the emergency response computing device is an emergency response personnel's portable device.

11. The medium of claim 9, wherein the at least one secondary subsystem includes at least two subsystems selected from a sprinkler subsystem, a surveillance subsystem, and the heating ventilation air conditioning subsystem.

* * * * *